UNITED STATES PATENT OFFICE.

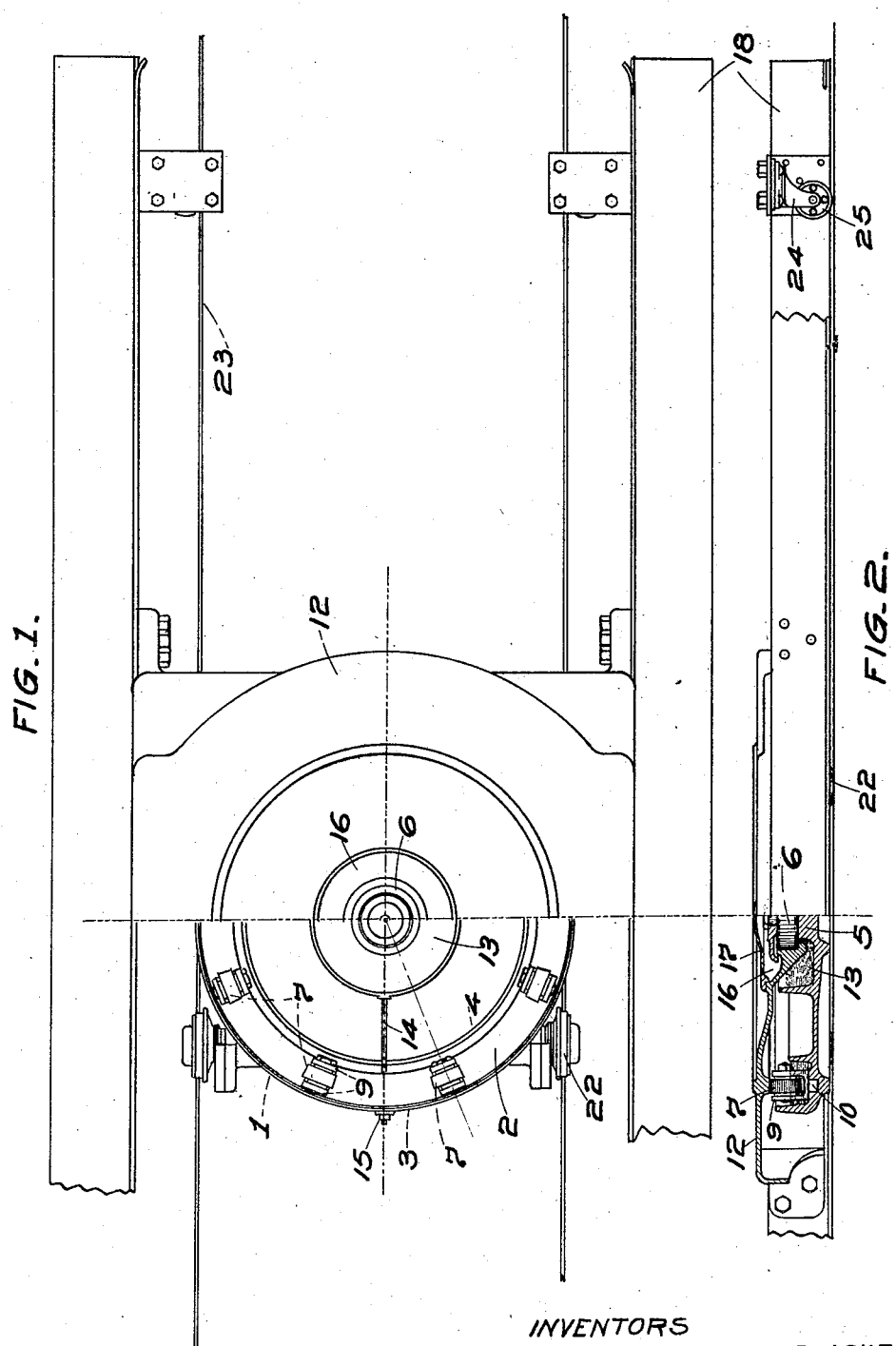

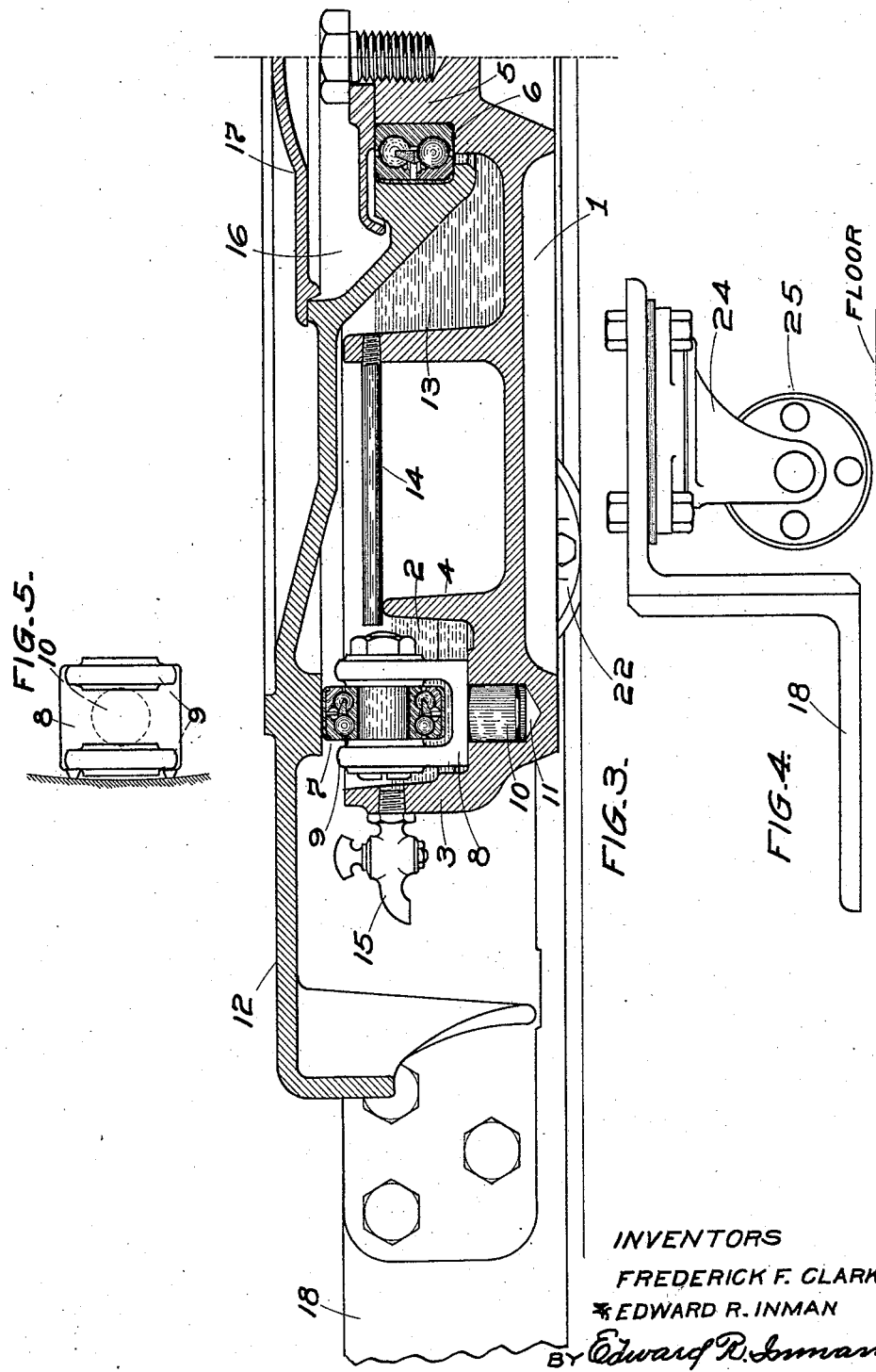

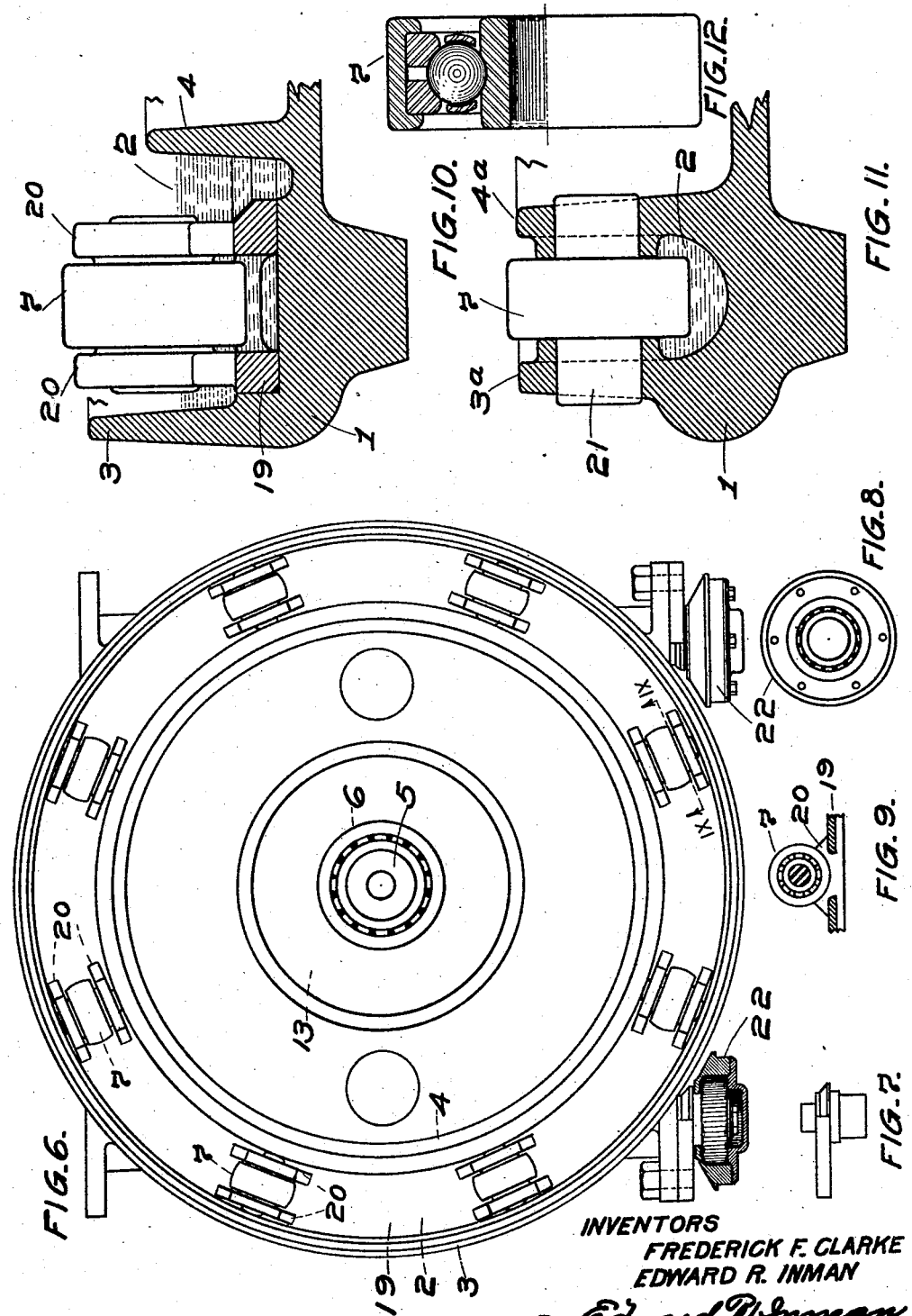

FREDERICK F. CLARKE AND EDWARD R. INMAN, OF FRANKLIN, PENNSYLVANIA.

TURNTABLE FOR AUTOMOBILES.

1,421,066.         Specification of Letters Patent.     Patented June 27, 1922.

Application filed February 2, 1920. Serial No. 355,649.

*To all whom it may concern:*

Be it known that we, FREDERICK F. CLARKE and EDWARD R. INMAN, citizens of the United States, residing at Franklin, in the county of Venango and State of Pennsylvania, have invented certain new and useful Improvements in Turntables for Automobiles, of which the following is a specification.

The objects, construction and operation of this invention are herein set forth with sufficient clearness to enable those skilled in the respective arts to which its construction and use relate, to make and use the same.

The object of this invention is to provide a turn table for automobiles which is so constructed that the antifriction bearing elements employed therein may be of some of the commercial types of bearings that are made by experienced manufacturers. A properly constructed antifriction bearing of any type is a highly specialized product, which can be made only with special equipment and expert operatives: a so-called antifriction bearing produced in any other way is likely to be the source of trouble and failure. Furthermore, an antifriction bearing of any type, or however constructed depends, for success, in a large degree upon proper lubrication. It is a further object of this invention to provide a turn table with such lubrication features.

Heretofore turn tables for automobiles have been supplied with bearings constructed without due regard for, or a proper knowledge of the principles involved or of the lubrication requirements, and for this reason nearly all of these turn tables have required too much power for their operation and the bearings have failed very quickly under actual service. It is therefore, as previously stated, the object of this invention to supply a turn table for automobiles which may be practicably equipped with properly constructed bearings that are manufactured by experts and to provide proper lubrication for such bearings.

The construction whereby we attain said objects is clearly illustrated in the drawings which form a part hereof and in which:

Fig. 1 is a plan view of our improved turn table with one half of the turret removed to expose the base to view.

Fig. 2 is a side elevation of our turn table with one end shown in central vertical section with one end of the carriers broken away, and a portion of the opposite end of one of the carriers removed.

Fig. 3 is an enlarged, central vertical section of one half the turret and base of our turn table.

Fig. 4 is an end view of one of the carriers showing a supplementary or emergency caster which may be employed in some classes of service.

Fig. 5 is a bearing for an antifriction roller which supports the turret.

Fig. 6 is an enlarged plan view of the base equipped with a modified form of annular bearing from that shown in Figs. 1–5.

Fig. 7 is an axle for the mobility wheels.

Fig. 8 is an elevation of one of the mobility wheels with the cap removed.

Fig. 9 is a section taken at line IX—IX of Fig. 6.

Fig. 10 is a vertical section of Fig. 6 taken through the lubricant channel and the bearing element which is positioned therein.

Fig. 11 is a vertical section through the circumference of a modified form of base in which the roller bearings are carried directly by the flanges which form the lubricant channel.

Fig. 12 shows one form of ball-bearing roller-bearing which we employ.

It will be noted that we have shown several forms of bearings. Neither of these forms can be designated as the preferred form, for the reason that they are all capable of performing equally efficient service, and the form selected will in nearly all cases be determined by the shop methods employed and the machine tools and other equipment available for manufacturing the turn table.

The construction shown in the drawings is as follows:

Referring especially to Figs. 1, 2, 3, and 5: a base 1 is provided which is circular in shape and has, as special features thereof, an annular channel 2 adjacent to its outer circumference. This channel is formed by the circumferential flange 3, and an inner concentric flange 4. Said base is also provided with a centrally-located pivot or stub-shaft 5, upon which is mounted a combined thrust and radial bearing 6.

Within said lubricant channel we locate a plurality of roller bearings 7 which are of the ball-bearing type, one of which is shown in section in Fig. 3. Said rollers 7 are each mounted in a bracket—Fig. 5,—which is composed of a base 8, arms 9 and pin 10; said pin being adapted to occupy a socket 11 in the base 1. Bearings thus constructed and mounted are adapted to revolubly support the turret 12 which also engages the pivotal bearing 6, whereby the relative concentric positions of the turret and base are maintained.

An oil receptacle 13 surrounds the pivotal bearing 6, and supplies lubricant continually thereto. A pipe 14 leads from said central oil receptacle to the annular channel 2. Said channel is supplied with a pet-cock 15 at a height to which it is desired to have the oil stand in said channel 2. Above the central bearing 6 a dish or depression 16 is formed which is supplied with a readily removable cover 17. When oil is to be supplied to the receptacle 13, and channel 2, cover 17 is removed; the pet-cock 15 is opened and oil is poured into said depression 16, from whence it flows through bearing 6 to receptacle 13, hence through pipe 14 to channel 2, until it reaches the pet-cock; when oil begins to flow from said pet-cock, it indicates that there is a sufficient quantity of oil in the base to properly lubricate the bearings therein. The lubricant thus supplied is sufficient to copiously lubricate the turret bearings for several months.

The turret 12 is supplied upon two opposite sides with carriers 18 for the reception of the wheels of an automobile.

In Figs. 6, 9 and 10 we have shown a form of annular bearing which differs from that shown in Figs. 1, 2 and 3 in the respect that an annulus or ring 19, which is adapted to occupy said channel 2, is supplied with a plurality of pairs of upwardly projecting arms 20 for the mounting and support of the rollers 7, which rollers 7 may be identical with those used in the Fig. 3 form. This form of bearing may, under some circumstances, be more conveniently and cheaply machined and manufactured than the Fig. 3 form.

In Fig. 11 we have shown still another method of mounting the roller-bearings 7. In this form the flanges 3ª and 4ª are positioned closer together and the bearing pin 21 which supports the roller-bearing 7 passes directly through said flanges. In some cases this form of bearing might be more conveniently and cheaply manufactured than the two forms previously described. In all these forms the lubricant channel remains substantially the same.

The base 1 is supplied with mobility wheels 22 by means of which the mobility or portability of the turn table is effected. They are preferably adapted to travel upon a track 23, the upper face of which is flush with the surface of the floor. The axle by means of which said wheels are mounted upon the base is shown in Fig. 7.

The carriers 18 are preferably structural steel angles, and the length of the same is such as to adapt them to carry automobiles having the longer wheel bases,— a length of fourteen feet being usually employed.

It has been found commercially desirable to employ angles of various thicknesses to meet differing classes of service, but in most cases angles of one half inch in thickness have ample strength and rigidity to carry the required load. However, as a precautionary measure, and to prevent too severe a strain upon these carriers and the turret bearings should an unusually heavy load be run upon the turn table, we place at the extreme ends of the carriers a caster 24, Fig. 4, of suitable strength and ample proportions to carry the excess load in case the ends of said angles are caused to be sprung downwardly. From an inspection of said Fig. 4, it will be noted that the portion of the periphery of the caster wheel 25 which is in juxtaposition to the floor, projects below the corresponding face of the carrier 18, and that in case said carrier is sprung downwardly, the caster wheel will contact with the floor and prevent any further downward spring of the carrier. In this way, the ends of the carriers are prevented from coming into contact with or impinging upon the floor, and the mobility of the turn table is thereby insured under any condition of load. An excessive pressure upon the rollers 7 is also prevented.

With the exception of certain novel details and combination of same, our improved turn table employs the general construction covered by Letters Patent of the United States issued to Richard B. Iseman on the 19th day of August, 1919, No. 1,313,486. It also employs certain details of construction shown and described in a co-pending application filed by Edward R. Inman, (one of these applicants) on the 26th day of January, 1920, Ser. No. 354,035.

We claim the following:

1. In a turn table for automobiles, in combination, a portable base, lubricant containers in said base, one of which surrounds the pivotal point of said base, the other of said containers forming an annular concentric channel adjacent to the outer portion of said base, roller bearings of the ball-bearing type carried by said base within said containers, a turret revolubly mounted upon said base supported by said bearings, and automobile carriers carried by said turret.

2. In a turn table for automobiles in combination, a base, mobility wheels carrying and fully supporting said base, lubricant containers in said base, rollers of the ball-bearing type mounted in said containers and adapted to support a turret, a turret revolubly mounted upon said base supported by said bearings, and carriers for an automobile carried by said turret.

3. In a turn table for automobiles in combination, a base, having as features thereof an annular channel and a reservoir or container concentric with said channel adapted to contain a lubricant, bearings of the ball-bearing type mounted in said channel and said container and adapted to revolubly carry a turret, a turret revolubly carried by said bearings, automobile carriers carried by said turret, and means carried by said carriers to prevent the contact of same with the floor under the excess load.

4. In a turn table for automobiles a base, having as features thereof a plurality of vertically-disposed, annular flanges adapted to form reservoirs for lubricant, means for effecting the distribution of lubricant from one to the other of said receptacles, and means determining the depth of the body of lubricant in said reservoirs.

5. In a turn table for automobiles, a base having as features thereof, a central receptacle adapted to contain a lubricant, and an annular channel concentric with said receptacle also adapted to contain a lubricant, a pipe or duct leading from said receptacle to said channel, for the passage of lubricant therethrough, and means communicating with said channel adapted to indicate and determine the depth of lubricant in said channel.

6. An automobile turn table comprising in combination, a base, having as features thereof lubricant containers adapted for the reception of antifriction bearings, antifriction bearings positioned within said containers and adapted for the carrying of a turret, mobility wheels carrying and fully supporting said base, a turret revolubly mounted upon said base, automobile carriers carried by said turret and normally supporting the same.

7. An automobile turn table comprising in combination a circular base having as features thereof lubricant containers, antifriction bearings positioned within said lubricant containers adapted to revolubly carry a turret, mobility wheels for said base positioned without the circumference thereof, fully supporting same, a rectangular turret revolubly carried by said bearings, and carriers for an automobile carried directly by said turret.

8. An automobile turn table comprising in combination a base having as features thereof containers for the reception of lubricant, antifriction bearings carried by said base within said containers adapted for the revoluble mounting of a turret, a turret revolubly carried by said antifriction bearings, automobile carriers carried by said turret and normally supported thereby and supplementary supporting means for said carriers operative under excess load.

In testimony whereof we affix our signatures.

FREDERICK F. CLARKE.
EDWARD R. INMAN.